(12) United States Patent
Wilson (10) Patent No.: US 8,857,466 B1
(45) Date of Patent: Oct. 14, 2014

(54) IN-LINE UTILITY SHUT-OFF SYSTEM AND METHOD OF USE THEREOF

(76) Inventor: Thomas J. Wilson, Gilbert, AZ (US)

( * ) Notice: Subject to any disclaimer, the term of this patent is extended or adjusted under 35 U.S.C. 154(b) by 925 days.

(21) Appl. No.: 13/020,097

(22) Filed: Feb. 3, 2011

(51) Int. Cl.
*F16K 37/00* (2006.01)
*F16K 31/06* (2006.01)
*E03B 7/04* (2006.01)
*E03B 7/07* (2006.01)

(52) U.S. Cl.
USPC ............... 137/599.11; 137/601.14; 137/551; 251/129.04; 700/284

(58) Field of Classification Search
CPC ............ E03B 7/071; E03B 7/095; F17D 5/06
USPC ........... 137/601.14, 551, 599.11; 251/129.04; 700/284
See application file for complete search history.

(56) References Cited

U.S. PATENT DOCUMENTS

| | | | |
|---|---|---|---|
| 5,348,269 A | 9/1994 | Moseley | |
| 5,655,561 A * | 8/1997 | Wendel et al. | 137/79 |
| 5,794,653 A | 8/1998 | DeSmet et al. | |
| 5,881,755 A * | 3/1999 | Dieringer | 137/1 |
| 5,967,171 A | 10/1999 | Dwyer, Jr. | |
| 6,003,536 A | 12/1999 | Polverari et al. | |
| 6,105,607 A | 8/2000 | Caise et al. | |
| 6,209,580 B1 | 4/2001 | Foster | |
| 6,229,450 B1 * | 5/2001 | Malmsten | 340/652 |
| 6,612,536 B2 | 9/2003 | Dalton | |
| 6,758,238 B2 | 7/2004 | Callies | |
| 6,987,458 B1 * | 1/2006 | Limmer | 340/605 |
| 7,111,817 B2 | 9/2006 | Teti et al. | |
| 7,147,204 B2 * | 12/2006 | Hollingsworth et al. | 251/129.04 |
| 7,306,008 B2 | 12/2007 | Tornay | |
| 7,818,094 B2 * | 10/2010 | Rambicourt et al. | 700/282 |
| 7,900,650 B1 * | 3/2011 | Wilson | 137/601.14 |
| 2008/0007879 A1 * | 1/2008 | Zaretsky et al. | 361/42 |

* cited by examiner

*Primary Examiner* — Atif Chaudry
(74) *Attorney, Agent, or Firm* — Robert C. Montgomery; Montgomery Patent & Design (57) ABSTRACT

A system that provides for the remote control shutoff of a main supply of a utility to a structure in an unattended manner comprises a solenoid activated shutoff valve typically mounted immediately downstream of a main shutoff valve and a securable enclosure containing a remote control switch and audible alarm unit electrically connected to a power source. A manual bypass valve is provided as an override should it be required. Because the system requires electricity to operate, a general power failure will automatically shut off of the water supply. No back-up power source, such as a back-up battery, is utilized with the present system. Further, activation of the system is accomplished using a remote control to control the system from a distance.

16 Claims, 6 Drawing Sheets

IN-LINE UTILITY SHUT-OFF SYSTEM AND METHOD OF USE THEREOF

RELATED APPLICATIONS

The present invention was first described in and claims the benefit of U.S. Provisional Patent Application No. 60/854,477 filed on Oct. 27, 2006, and U.S. Non-Provisional application Ser. No. 11/978,486, the entire disclosures of which are incorporated herein by reference.

FIELD OF THE INVENTION

The present invention relates generally to an automatic and remote shutoff control for a utility supply to a structure and, more particularly, to said apparatus being capable being operated in an unattended manner.

BACKGROUND OF THE INVENTION

Water damage from a broken pipe, a worn out water heater or other water supplied appliance can cause major property damage and serious financial consequences. The only certain method to guarantee that this does not occur is to shut off the main water line. Unfortunately, many people are incapable of locating the shut-off valve for their water line and may be physically unable to shut it off. Similar issues are encountered in the operation of other utility supply lines such as natural gas pipes. Accordingly, there exists a need for a means by which main water flow into a home, building or business can be easily, quickly and remotely shut off without the disadvantages as described above. The development of the invention herein described fulfills this need.

Several attempts have been made in the past to provide a means and a method for a quick and effective shut-off system for in-house utilities, especially main line water valves, particularly during extended periods of non-use. U.S. Pat. No. 6,612,536 issued to Dalton discloses a remote shut-off valve. This patent does not appear to disclose an apparatus that operates on demand using a wireless remote control.

U.S. Pat. No. 6,209,580 issued to Foster discloses a multi-function valve assembly. This patent does not appear to disclose an apparatus that operates on demand using a wireless remote control.

U.S. Pat. No. 6,105,607 issued to Caise discloses a microprocessor controlled water shut-off device. This patent does not appear to disclose an apparatus that operates on demand using a wireless remote control.

U.S. Pat. No. 6,003,536 issued to Polverari discloses an automatic shut-off valve that operates when it senses a leak in the system. This patent does not appear to disclose an apparatus that operates on demand using a wireless remote control.

U.S. Pat. No. 5,967,171 issued to Dwyer discloses a shut-off system for preventing water damage that operates when it detects a leakage of water in the system. This patent does not appear to disclose a solenoid to activate the control valve nor does the apparatus appear to operate on demand using a wireless remote control.

U.S. Pat. No. 5,794,653 issued to DeSmet discloses a water shut-off valve and control system that operates on a timer. This patent does not appear to disclose a control valve operated by a wireless remote control.

U.S. Pat. No. 5,348,269 issued to Moseley discloses an inline pneumatic/mechanical flow control valve system. This patent does not appear to disclose a control valve that operates on demand using a wireless remote control.

SUMMARY OF THE INVENTION

In view of the foregoing disadvantages inherent in the prior art, it has been observed that there is need for an on demand remote wireless control for a utility supply valve to a structure.

The in-line utility shut-off system provides a convenient, easy to use method for controlling a flow of a fluid utility supply such as water or gas into a residence or commercial structure.

The in-line utility shut-off system is comprised of a solenoid, a spring return valve, transformer and a wireless RF remote controller.

The in-line utility shut-off system is an electrically operated and RF wirelessly controlled apparatus to control the flow of the fluid supply into a structure.

The in-line utility shut-off system is wall mounted downstream of a utility meter.

The in-line utility shut-off system is comprised of a compact, portable wireless RF remote controller attachable to an existing key-ring.

The in-line utility shut-off system automatically responds to an interruption in electrical service by closing the utility supply valve. For water supplies, this further keeps the system's water pressure elevated for use by emergency services.

The in-line utility shut-off system possesses a manual by-pass valve permitting override of the system.

The in-line utility shut-off system may be used by individuals with physical disabilities which may make it difficult for them to access and manipulate a conventional utility supply shut-off valve.

The in-line utility shut-off system can avoid costly damage to residences and businesses by providing a means to immediately terminate utility service in the event of a broken pipe, or inefficient or broken appliance.

The in-line utility shut-off system is a generally rectangular compact enclosure which is plugged into and support by an existing GFCI receptacle and includes and a step down transformer converting the electrical charge to 24-volts for operation of the spring return valve.

The in-line utility shut-off system comprises a removably attachable optional antenna which can be inserted into a cover aperture to enable transmission of a signal from a further distance away from the enclosure.

The in-line utility shut-off system, in an alternate embodiment, possesses an audible or visual alarm to indicate the activation of the spring control valve to alert occupants that the utility supply delivery has been altered.

The in-line utility shut-off system, in an alternate embodiment, possesses X-10 communication capabilities that enable control of the system via the internet and a remote computer.

The prior art discloses devices which control main water supply line water flow through various means. The prior art does not appear to teach a utility control valve that operates on demand through the use of a wireless remote control with a manual override function.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 in-line wireless remote control shut-off system
11 key
20 enclosure
21 blade
25 cover
26 cover aperture
27 optional antenna
30 solenoid
34 wireless receiver
35 receiver antenna
36 solenoid wire
40 spring return valve
50 transformer
57 speaker
58 audible alarm
59 red warning light
60 ground fault circuit interrupt (GFCI) receptacle
70 remote control switch
80 wireless remote controller
81 controller button
82 controller front cover
83 controller rear cover
84 slot
85 radio frequency (RF) signal
86 controller circuitry
87 controller battery
88 transmitter
89 transmitter antenna
90 inlet
95 outlet
100 flow
110 union fitting
120 supply plumbing
125 bypass piping
130 bypass valve
135 tee-fitting

DETAILED DESCRIPTION OF THE PREFERRED EMBODIMENT

Figure 4:
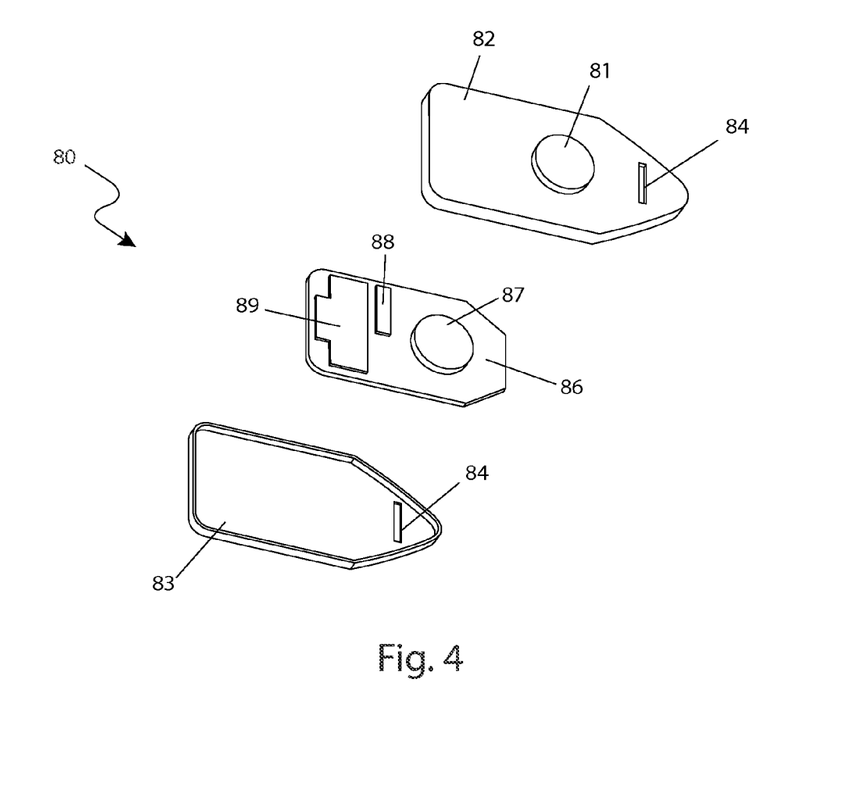
FIG. 4 is an exploded perspective view of the remote controller 80, according to a preferred embodiment of the present invention.
Figure 5:
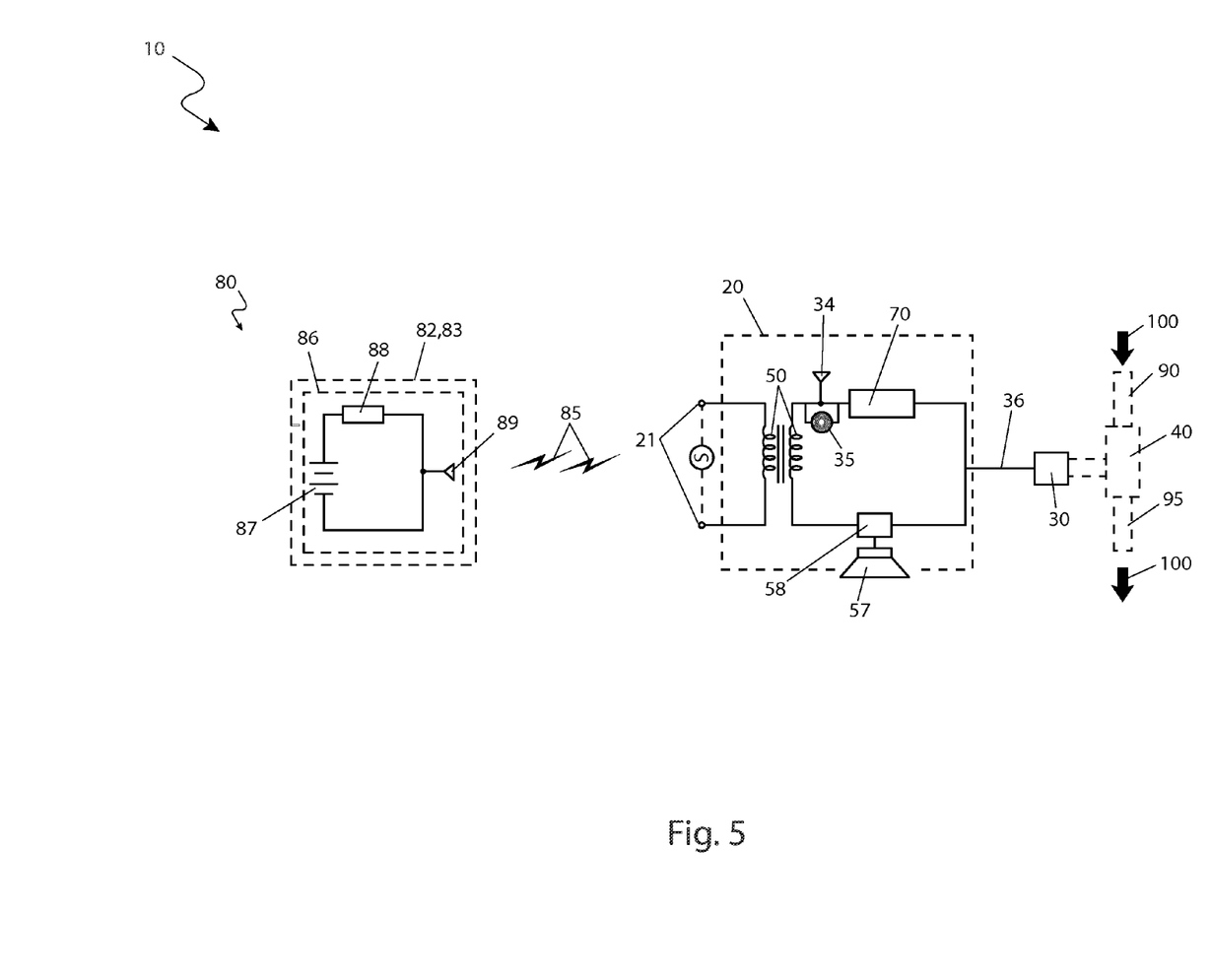
FIG. 5 is an electrical block diagram of the in-line remote control shut-off system 10, according to a preferred embodiment of the present invention.
Figure 6:
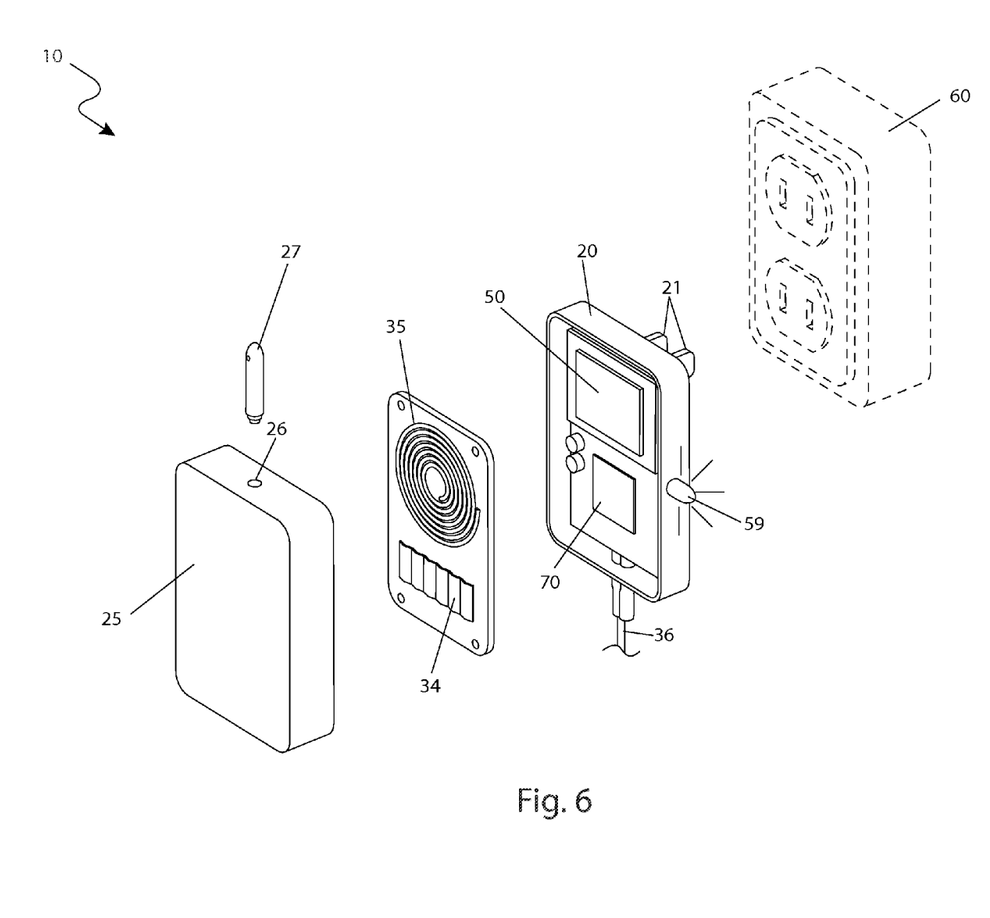
FIG. 6 is a close-up view of the 10 in-line remote control shut-off system 10 depicting an alternate red warning light 59, according to an alternate embodiment of the present invention; and, FIG. 7 is an electrical block diagram of the in-line remote control shut-off system 10 depicting an alternate red warning light 59, according to a preferred embodiment of the present invention.
Figure 7:
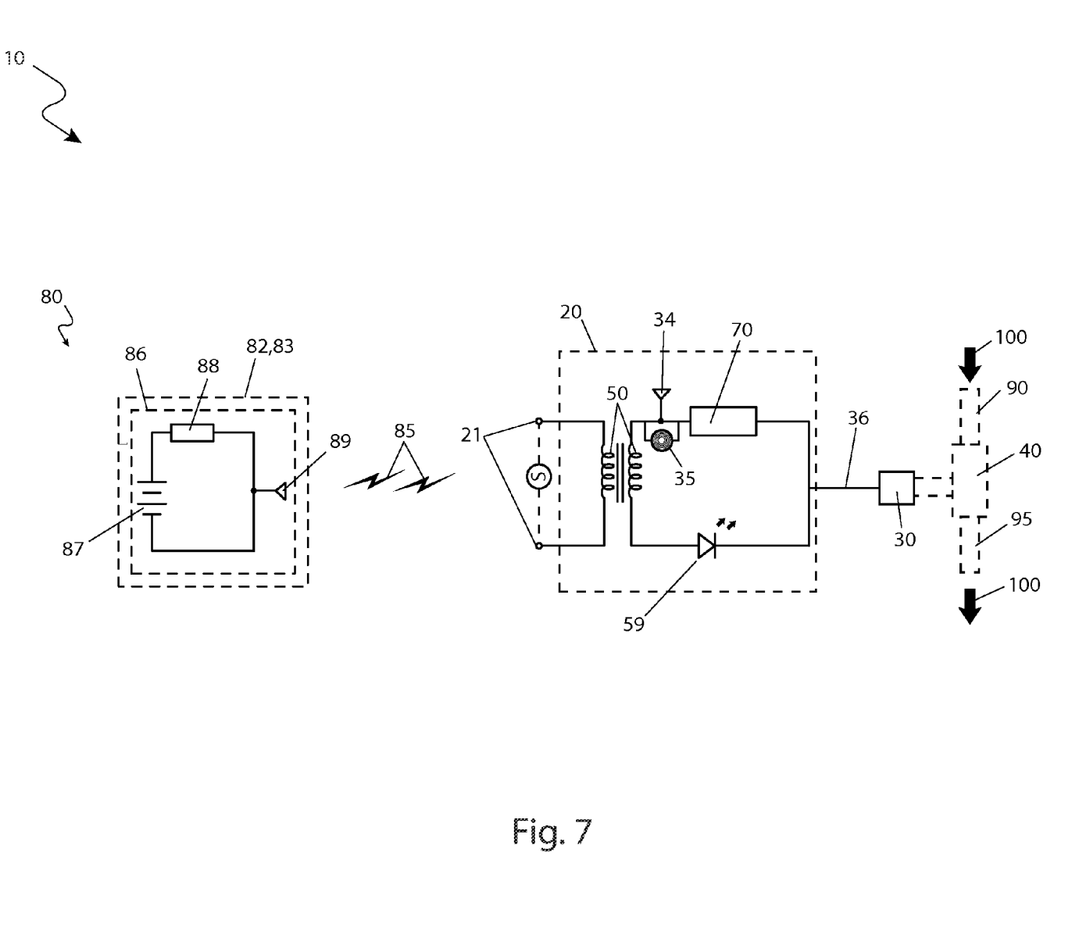

The best mode for carrying out the invention is presented in terms of its preferred embodiment, herein depicted within FIGS. 1 through 5 and in terms of an alternate embodiment, herein depicted in FIGS. 6 and 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an in-line remote control shut-off system and method that provides for the wireless remote control shutoff of a main water or gas valve to a structure and/or household appliance in an unattended manner. The in-line remote control shut-off system (herein described as the "system") 10 provides water or gas flow 100 to cease in the event of a power failure or activate or deactivate upon remote manipulation. The system 10 comprises a solenoid 30 activated shutoff valve 40 typically mounted immediately downstream of a main shutoff valve and an enclosure 20 containing a remote control switch 70 and audible alarm unit 58.

Figure 1:
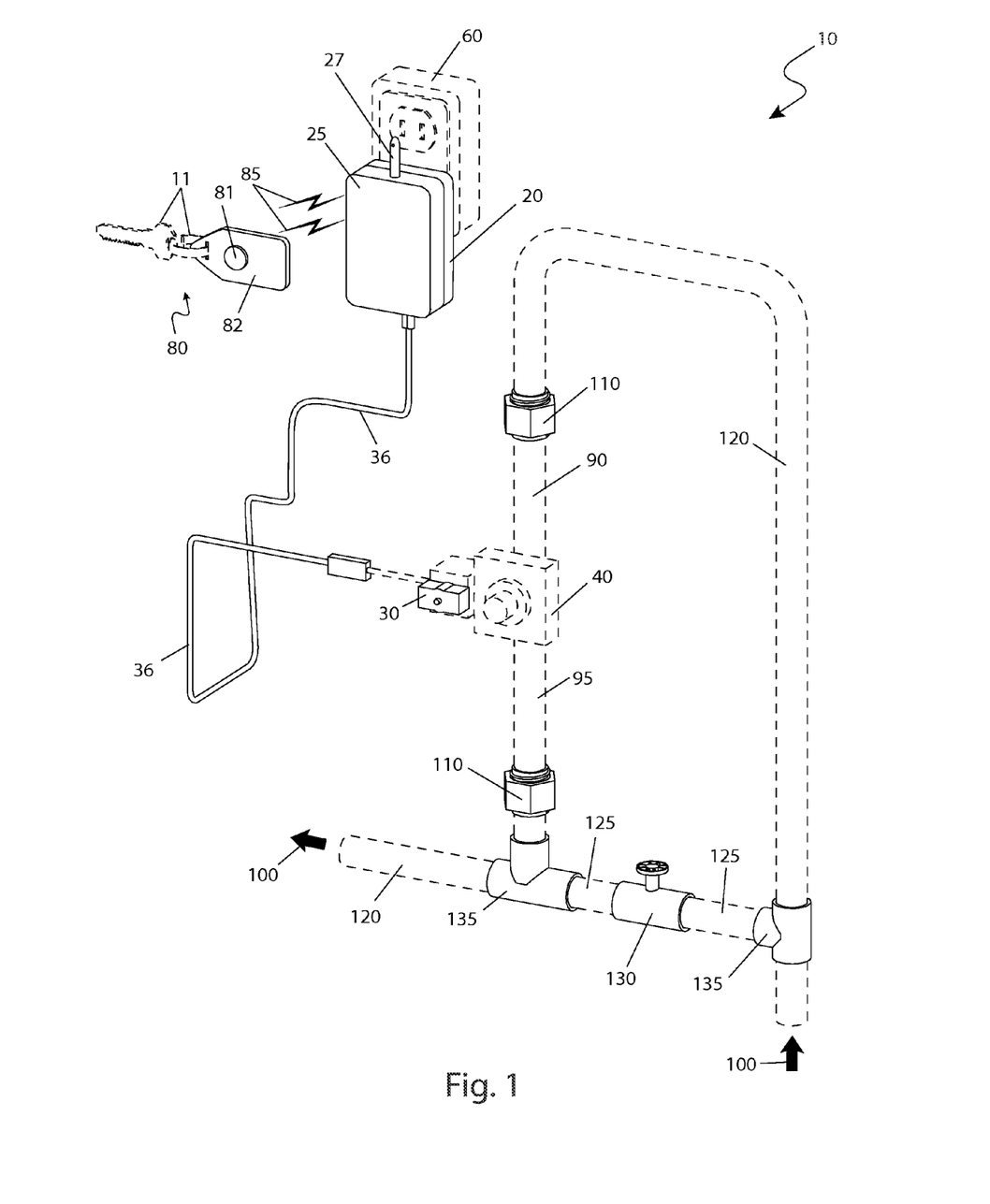
FIG. 1 is a front view of an in-line wireless remote control shut-off system 10 depicting a wireless remote controller 80 and associated plumbing, according to the preferred embodiment of the present invention.
Figure 2:
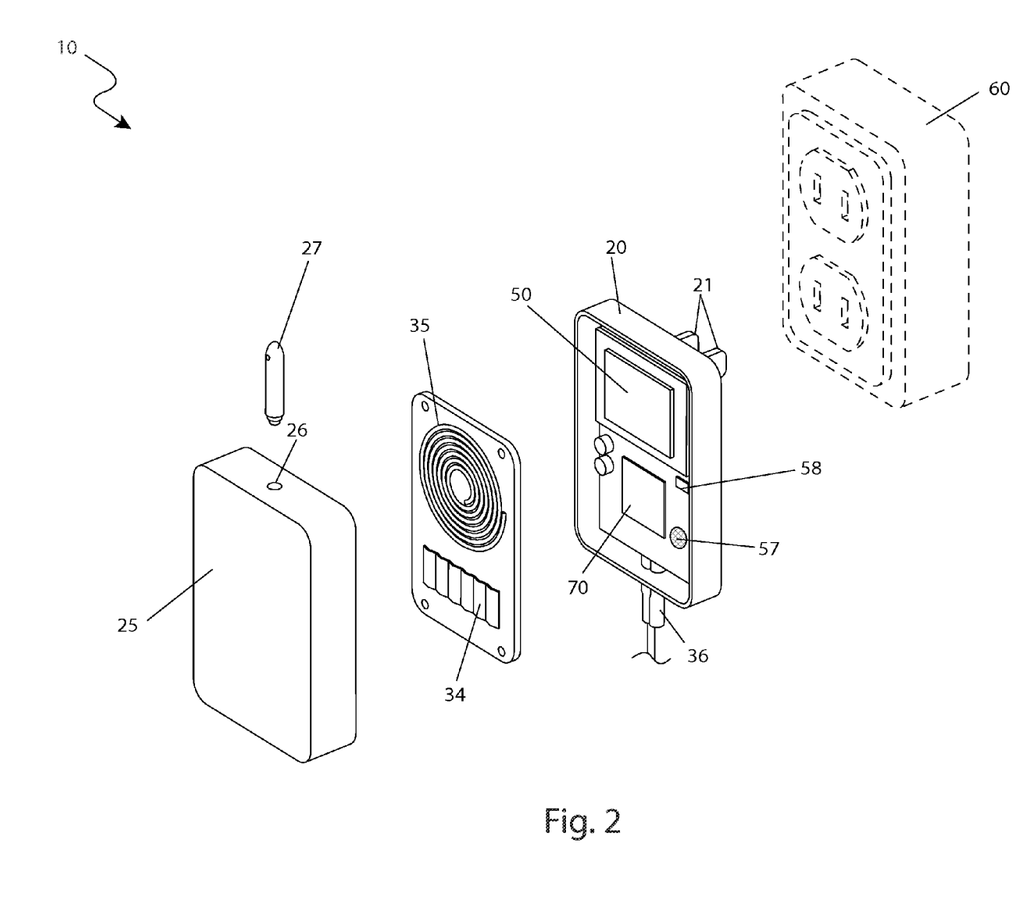
FIG. 2 is a close-up view of the 10 in-line remote control shut-off system 10 depicting an open cover portion 25, according to a preferred embodiment of the present invention.

Referring now to FIG. 1, a front view of the system 10 depicting a remote controller 80 and associated plumbing and FIG. 2, close-up view of the 10 system 10 depicting an open cover portion 25, according to the preferred embodiment of the present invention, are disclosed. The system 10 comprises a generally rectangular compact enclosure 20 which is plugged into an existing ground fault circuit interrupter (GFCI) receptacle 60 and interconnected via solenoid wire 36 to a solenoid 30 to remotely activate or deactivate a spring return valve 40. The GFCI receptacle 60 provides electrical power to the system 10 being in electrical communication with an existing residential 110-volt electrical power system. The GFCI receptacle 60 comprises a conventional design with a rectangular face, two (2) female adapters embedded in, and a reset button. The GFCI receptacle 60 provides continuous power to a step down transformer 50 which is located within the enclosure 20. The transformer 50 provides 24-volt electrical power to the remote control switch 70 via inserting the enclosure 20 into a respective GFCI receptacle 60 via a pair of blades 21 which extends from a rear surface of said enclosure 20 which are inserted into the female adapters on said GFCI receptacle 60. The step-down transformer 50 comprises a commercially available unit providing a standard 110-volt to 24-volt DC conversion means in an expected manner. The GFCI receptacle 60 is preferably provided with X-10 communication capabilities, which enables activation/deactivation of the system 10 via a remote computer and/or internet means which halts or reestablishes a water flow 100 through the system 10. The GFCI receptacle 60 may be provided as a common duplex outlet without ground fault protection based upon electrical codes and a user's preference.

The current which the blades 21 conduct is regulated by the transformer 50 to provide continuous 24-volt power to the components within the enclosure 20. The enclosure 20 also provides housing and mounting means to internal electrical components and further includes a cover 25, a remote control switch 70, an audio alarm 58, and a receiver 34. The cover 25 is preferably fixed to the enclosure 20, yet may also be removably attached via locking features such as hinging, screws, or the like in an expected manner. The enclosure 20 is to provide sufficient interior volume to contain the aforementioned components. The enclosure 20 is to be made using durable waterproof materials such as stainless steel, fiberglass, plastic, or the like to provide a sealed housing to prevent corrosion from coming in contact with the internal electrical and electronic components.

The remote control switch 70, when activated by a signal 85 transmitter from a wireless remote controller 80, conducts power to the solenoid 30 which provides a 24-volt power distribution to the solenoid 30 activated shutoff valve 40 via a solenoid wire 36. The spring return valve 40 would typically be mounted upon a wall surface using common fasteners and located immediately downstream of an existing main shutoff valve in a residence or business. The system 10 utilizes an inlet source 90 to a spring return valve 40 exiting to an outlet 95. The spring return valve 40 is in fluid or gas, corresponding to the use of water or gas sources, communication between the inlet 90 and outlet 95 for the assisting in the regulation of a flow 100 by closing which obstructs the flow 100 through the supply plumbing 120. The spring return valve 40 is in the open state meaning flow 100 is distributed to establish open communication between the inlet 90 and the outlet 95. The spring return valve 40 is preferably a normally-closed spring return valve 40 being opened by conducting an electric current through an electrical solenoid 30 mounted on said spring return valve 40, thus changing to an open state. The solenoid 30 is controlled directly by the remote control switch 70 located within the enclosure 20, and thus providing a very low reaction time. The spring return valve 40 comprises a pair of ports, in which the flow 100 is switched on or off. The spring return valve 40 is designed to minimize restriction to the flow 100 when in an open state. The spring return valve 40 comprises metal or rubber seals designed to effectively seal the flow 100 when in the closed state and comprises a particular fabrication of parts and materials based on a desired method of use; i.e. gas lines requiring non-sparking materials such as brass.

A user may engage halting or opening action acting upon a continuous flow 100 of a main line by successive actuation of the wireless remote controller 80. More specifically, to engage a halting of said flow 100, said remote controller 80 transmits a controlled RF signal 85 to a wireless remote control switch 70 which halts an electrical current to the solenoid portion 30 of the spring return valve 40 which closes said valve 40. This action closes the spring return valve 40 in communication between inlet 90 and outlet 95 halting the flow 100 through the system 10. To reestablish flow 100 through the line, actuation of the remote controller 80 (also see FIGS. 3 and 4) provides an opening action to the spring return valve 40 which provides a reestablishment of fluid or gas continuity between the inlet 90 and the outlet 95. The remote controller 80 provides transmission of a radio frequency (RF) signal 85 to the remote control switch 70. The enclosure 20 receives the signal 85 by a receiver 34 within the enclosure 20. The receiver 34 is interconnected to a receiver antenna 35 to assist in receiving the transmission of the signal 85. An additional or optional antenna 27 may also be provided to enable transmission of a signal 85 from a further distance away from the enclosure 20. In this embodiment the optional antenna 27 would be inserted into a cover aperture 26 located on an upper surface of the cover 25 and interconnected to the receiver antenna 35.

In addition to the remote activation of the spring return valve 40 as described above, the system 10 provides a halting function to the flow 100 upon the loss of electrical power which is directed to the blades 21 in the event of a local power failure, an open electrical breaker, or the like.

The 24-volt power is also directed to an audio alarm unit 58, or an alternate red warning light 59 (see FIGS. 6 and 7), within the enclosure 20. The audio alarm unit 58 provides an indication to occupants within a residence or commercial building of a stoppage of water or gas supply resulting from a general power failure within said residence or due to remote activation of the remote control switch 70. The audio alarm 58 is a commercially available alarm module comprising a switching hardware, wiring, and a speaker 57. The speaker 57 is a common miniature piezo-electrical type device.

The system 10 also comprises a pair of union fittings 110, a bypass valve 130, a pair of tee-fittings 135, and various bypass piping 125. The union fittings 110 provide a plumbing connection means to existing supply plumbing 120 in a residence or business as depicted here. Additionally, the system 10 comprises a bypass valve 130, a pair of tee-fittings 135, and various bypass piping 125 required to establish direct fluid communication between the inlet 90 and the outlet 95 portions. The bypass valve 130 provides an override means to the system 10 should it be required. The spring return valve 40, union fittings 110, and bypass piping 125 comprise a similar diametrical size as an existing plumbing system 120 within a residence so as to maintain a consistent flow and pressure through the system 10.

Figure 3:
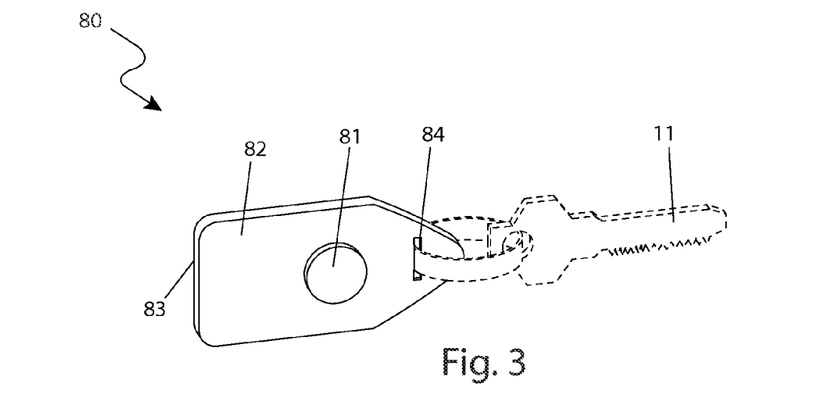
FIG. 3 is a perspective view of the remote controller 80, according to a preferred embodiment of the present invention.

Referring now to FIG. 3, a perspective view of the remote controller 80 and FIG. 4, an exploded perspective view of the remote controller 80, according to the preferred embodiment of the present invention, are disclosed. The remote controller 80 is preferably a small handheld key fob unit which enables a said remote controller 80 to be suspended with a plurality of existing keys 11 on a common keychain. Although the remote controller 80 is depicted as a handheld key fob it is known that other electronic devices may be utilized such as, but not limited to: a smart phone, a personal computer, or the like without limiting the scope of the system 10. The remote controller 80 comprises a controller front cover 82 and a controller rear cover 83 which house internal controller circuitry 86. The covers 82, 83 are comprise a generally rectangular shape and are preferably fabricated from a durable plastic, yet other materials may be utilized without limiting the scope of the system 10. A proximal end portion of each cover 82, 83 comprises a slot 84 which enables attachment to keys 11.

An exterior surface of the controller front cover 82 provides access to a controller button 81 which is preferably an electrical pushbutton. The controller button 81 is utilized to activate the internal controller circuitry 86 and transmit a RF signal 85 to the receiver 34 within the enclosure 20. The controller button 81 activates the transmitter 88 to transmit the RF signal 85 via the transmitter antenna 89 to the receiver 34 in a common manner. The controller circuitry 86 receives current by a controller battery 87 which is preferably a common user replaceable battery.

FIG. 5 is an electrical block diagram of the system 10, according to a preferred embodiment of the present invention. The system 10 receives 110-volt AC power from a local GFCI receptacle 60 (see FIG. 1). A step-down transformer 50 conducts a 24-volt current to the remote control switch 70. The remote control switch 70 provides a switching function similar to common garage door opening devices being activated by a RF signal 85 transmitted from the wireless remote controller 80. The remote controller 80 allows a user to remotely control the water flow 100 when desired during events such as, but not limited to, periods in which a residence is unoccupied, controlling water usage during particular periods of a day or week, and the like. The RF signal 85 is a one-way signal and does not provide for duplex communication or confirmation of a received RF signal 85. The RF signal 85 would be of a frequency modulated (FM) signal on a frequency authorized for such use; however, other methods of modulation such as amplitude modulation, single side band, digital, continuous wave and the like would work equally well, and as such, should not be interpreted as a limiting factor of the system 10. When activated to establish a water flow 100 through, said remote control switch 70 conducts a 24-volt current to an audible alarm 58 and the solenoid portion 30 of the spring return valve 40 to open said valve 40 maintaining a water flow 100 through. Conversely, if said wireless remote control switch 70 is activated to initiate a stoppage of a water flow 100 through the system 10, said output current is interrupted causing the spring return valve 40 to close and halt said water flow 100. The output voltage to the audible alarm unit 58 provides a power interruption audible alarm via a piezo speaker 57 during water flow 100 stoppages being initiated by an interruption of said output current from said remote control switch 70. Stoppage of said water flow 100, due to a loss of electrical power to said solenoid 30, may result from events such as activation of the remote control switch 70; or a general power supply failure. Additionally, activation/deactivation of the system 10 may be provided via a GFCI receptacle 60 comprising X-10 communication capabilities which enables remote activation via a computer and/or internet means.

Referring now to FIGS. 6 and 7, a close-up view and an electrical block diagram of the system 10 depicting an alternate red warning light 59, according to an alternate embodiment of the present invention. The system 10 may be introduced comprising a red warning light 59 along a side surface in lieu of the previously described speaker 57 and audible alarm 58, to communicate to an occupant a remote stoppage of water service.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: inserting the enclosure 20 via the blades 21 into a desired GFCI receptacle 60 which is at a location either adjacent to or remote of the main shutoff valve of the main line; installing the solenoid valve 40 immediately downstream of the main shutoff valve using the union fittings 110; installing the bypass valve 130 using the provided tee-fittings 135 and bypass piping 125; interconnecting the solenoid 30 to the enclosure 20 via solenoid wire 36; transmitting an OPEN signal 85 from a remote controller 80 via the transmitter 88 to the receiver 34 which activates the remote control switch 70 in the enclosure 20; enabling a flow 100 through the spring return valve 40 reestablishing fluid or gas continuity between the inlet 90 and the outlet 95; transmitting a CLOSE signal 85 from a remote controller 80; stopping a flow 100 through the spring return valve 40; automatically broadcasting an audible alarm 58, or alternately displaying a red warning light 59, to occupants of a building indicating stoppage of the flow 100; alternately, experiencing a general loss of power from a central power source; interrupting an electrical current to the solenoid 30; stopping a flow 100 through the spring return valve 40; automatically broadcasting said audible alarm 58; and, benefiting from automatic and/or remote control shut-off of a main water or gas supply which protects a residence or commercial building from damage which may result from being temporarily unattended.

Additionally, the bypass valve 130 may be utilized as a flow 100 override should it be required by disconnecting the enclosure 20 from the GFCI receptacle 60 and manually opening the bypass valve 130 by rotating a valve lever or knob upon in a counter-clockwise direction which establishes an optional fluid path between inlet 90 and outlet 95 portions.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A system for remotely controlling a shutoff of a main valve of a utility line to a structure, comprising:
    an electrically active solenoid shutoff valve mounted after an existing manual shutoff valve;
    a securable enclosure comprising:
        a power supply, comprising:
            an electrical connecting pair of blades removably connected to a power source; and,
            a step down transformer in electrical communication with said pair of blades;
        a remote control switch in electrical communication with said electrically active solenoid shutoff valve and said transformer; and,
        an alarm unit in electrical communication with said transformer;
    a remote control; and,
    a manual bypass valve and associated piping;
    wherein said power source is a ground fault circuit interrupter (GFCI) receptacle that provides continuous power to said transformer;
    wherein said system ceases delivery of a flow of a utility in an event of a power failure or remotely upon activation of said remote control switch by said remote control;
    wherein said enclosure is electrically connected to said power source of said structure adjacent to said electrically active solenoid shutoff valve at a distance required by local electrical codes; wherein said manual bypass valve provides an optional shutoff to said utility line; and wherein said GFCI receptacle further comprises X-10 communication capabilities, thereby enabling activation/deactivation of said system via a remote computer or smart phone, thereby halting or reestablishing said flow of said utility through said system.

2. The system of claim 1, wherein said step down transformer is a standard 110-volt to 24-volt DC converter.

3. The system of claim 1, wherein said enclosure is a waterproof and resilient device comprising:

a securable cover removably fastened to a rear portion and defining an interior within; and, a set of electronic components mounted and secured therein said interior, further comprising:

said transformer;

said remote control switch, further comprising an RF receiver;

said alarm unit; and, an electrically active shutoff valve wire electrically connecting said remote control switch to said electrically active solenoid shutoff valve;

wherein said cover provides a security means to said interior to prevent tampering;

wherein said alarm unit is activated during a power interruption; and, wherein said enclosure provides a sufficient interior volume to contain said set of electronic components.

4. The system of claim 3, further comprising an antenna removably inserted into a cover aperture located on an upper surface of said cover and in electrical communication with said receiver;

wherein said antenna enables transmission of a signal from said remote control to said receiver from greater distances.

5. The system of claim 4, wherein said alarm unit is an audible alarm comprising an internal battery, switching hardware, wiring, and a speaker.

6. The system of claim 4, wherein said alarm unit is a visual alarm comprising an indicating illumination lamp.

7. The system of claim 1, wherein said remote control comprises a hand-held device with a transmitting button that, when depressed, transmits a first and a second RF signal to said RF receiver of said remote control switch;

whereupon receipt of said first RF signal, said remote control switch halts an electrical current to said electrically active solenoid shutoff valve, thereby closing said electrically active solenoid shutoff valve;

whereupon receipt of said second RF signal, said remote control switch permits said electrical current to said electrically active solenoid shutoff valve, thereby opening said electrically active solenoid shutoff valve; and, wherein said remote control provides a halting or opening action acting upon said utility line by successive actuation of said electrically active solenoid shutoff valve.

8. The system of claim 7, wherein said first and second RF signal comprises a one-way frequency modulated (FM) signal.

9. The system of claim 1, wherein said manual bypass valve and associated piping further comprises various fittings and piping dimensions required to establish direct communication between an inlet and an outlet, thereby bypassing said electrically active solenoid shutoff valve so as to maintain a consistent flow and pressure through said system.

10. A system for remotely controlling a shutoff of a main valve of a utility line to a structure, comprising:

an electrically active solenoid shutoff valve mounted after an existing manual shutoff valve;

a securable enclosure comprising a securable cover removably fastened to a rear portion and defining an interior within;

a set of electronic components mounted and secured within said interior, having an electrical connecting pair of blades removably connected to said a power source, further comprising:

a step down transformer in electrical communication therewith said pair of blades;

a remote control switch in electrical communication with said electrically active solenoid shutoff valve and said transformer;

an alarm unit in electrical communication with said transformer; and, an electrically active shutoff valve wire electrically connecting said remote control switch to said electrically active solenoid shutoff valve;

a remote control comprising a hand-held device with a transmitting button that, when depressed, transmits a first and a second RF signal to said RF receiver of said remote control switch; and, a manual bypass valve and associated piping;

wherein said system ceases delivery of a flow of a utility in an event of a power failure or remotely upon activation of said remote control switch by said remote controller;

wherein said enclosure is electrically connected to said power source of said structure adjacent to said electrically active solenoid shutoff valve at a distance required by local electrical codes;

wherein said cover provides a security means to said interior to prevent tampering;

wherein said power source provides continuous power to said step down transformer;

wherein said step down transformer provides electrical power to said remote control switch and said alarm unit;

wherein said alarm unit is activated during a power interruption;

wherein said enclosure provides a sufficient interior volume to contain said set of electronic components;

whereupon receipt of said first RF signal, said remote control switch halts an electrical current to said electrically active solenoid shutoff valve, thereby closing said electrically active solenoid shutoff valve;

whereupon receipt of said second RF signal, said remote control switch permits said electrical current to said electrically solenoid shutoff active valve, thereby opening said electrically active solenoid shutoff valve;

wherein said remote control provides a halting or opening action acting upon said water flow by successive actuation of said electrically active solenoid shutoff valve;

wherein said manual bypass valve provides an optional shutoff to said utility line; and wherein said power source further comprises a GFCI receptacle, further comprising X-10 communication capabilities, thereby enabling activation/deactivation of said system via a remote computer thereby halting or reestablishing said flow of said utility through said system.

11. The system of claim 10, wherein said step down transformer is a standard 110-volt to 24-volt DC converter.

12. The system of claim 10, further comprising an antenna removably inserted into a cover aperture located on an upper surface of said cover and in electrical communication with said receiver;

wherein said antenna enables transmission of a signal from said remote control to said receiver from greater distances.

13. The system of claim 10, wherein said alarm unit is an audible alarm comprising an internal battery, switching hardware, wiring, and a speaker.

14. The system of claim 10, wherein said alarm unit is a visual alarm comprising an indicating illumination lamp.

15. The system of claim 10, wherein said first and second RF signal comprises a one-way frequency modulated (FM) signal.

16. A method of installing and utilizing a system for remotely controlling a shutoff of an electrically active solenoid shutoff valve of a utility line to a structure comprises the following steps:
- providing an enclosure comprising:
  - a securable cover removably fastened to a rear portion and defining an interior within;
  - a pair of blades extending outwardly from said rear portion;
  - a set of electronic components mounted and secured therein said interior, further comprising a transformer in electrical communication with said pair of blades, a remote control switch comprising an RF receiver and in electrical communication with said transformer, an alarm unit in electrical communication with said transformer;
- installing said electrically active solenoid shutoff valve immediately downstream of said main shutoff valve;
- installing a bypass valve around said electrically active solenoid shutoff valve;
- connecting an electrically active solenoid shutoff valve wire from said remote control switch of said enclosure to said electrically active solenoid shutoff valve;
- activating said system by electrically connecting said pair of blades of said enclosure to a power source adjacent to said main shutoff valve at a minimal distance determined by local codes;
- wherein said power source further comprises a GFCI receptacle, further comprising X-10 communication capabilities, thereby enabling activation/deactivation of said system via a remote computer thereby halting or reestablishing said flow of said utility through said system;
- transmitting a first RF signal from a hand-held remote control to said RF receiver of said remote control switch, thereby enabling a flow of a utility through said electrically active solenoid shutoff valve;
- transmitting a second RF signal from said remote control to said RF receiver to said remote control switch, thereby stopping a water flow through said electrically active solenoid shutoff valve;
- automatically broadcasting an alarm via said alarm unit to occupants of said structure indicating stoppage of said flow of said utility due to receipt of said second RF signal;
- automatically broadcasting an alarm via said alarm unit to occupants of said structure indicating stoppage of said flow of said utility due to a general loss of power from said power source, which interrupts an electrical current to said electrically active solenoid shutoff valve and stops said flow of said utility; and,
- protecting said structure from damage due to a stopped flow of said utility.

* * * * *